Sept. 13, 1966  C. F. BUECHELE ET AL  3,271,846
MULTI-LAYER LAMINATES AND METHOD OF MANUFACTURING
HOLLOW ARTICLES THEREFROM
Original Filed Feb. 7, 1962

INVENTORS
CALVIN F. BUECHELE
BY JOHN R. WESTWOOD
Glenn & Jackson
ATTORNEYS

United States Patent Office 3,271,846
Patented Sept. 13, 1966

3,271,846
MULTI-LAYER LAMINATES AND METHOD OF MANUFACTURING HOLLOW ARTICLES THEREFROM
Calvin F. Buechele, Louisville, and John R. Westwood, Erlanger, Ky., assignors to Reynolds Metals Company, Richmond, Va., a corporation of Delaware
Continuation of application Ser. No. 177,688, Feb. 7, 1962. This application Nov. 10, 1965, Ser. No. 510,442
12 Claims. (Cl. 29—157.3)

This is a continuation of prior U.S. application Serial No. 177,688, filed February 7, 1962, which in turn is a continuation-in-part of prior application Serial No. 719,688 filed March 6, 1958, now abandoned.

This invention relates to the manufacture of inflatable laminates suitable for producing hollow articles and products, and more specifically to an improved method wherein such a laminate is subjected to fluid under pressure to promote hollowing.

An object of this invention is the provision of a practical and reliable method for making hollow products from a novel laminate which contributes materially to ease and facility of manufacture of the hollow products in a shaping die.

Another object of the invention is that of providing a highly satisfactory method of pressure shaping laminated sheet, using fluid under pressure between the outside layers of the laminate, and which method introduces a very worthwhile mode of separation and working of the laminate in an external shaping die after the laminate has been easily brought into proper alignment with the die for the shaping operation to proceed.

Another object is the provision of a method of the character indicated in which the sheet components have reluctance against being separated from each other in the die except progressively by increments under the application of fluid pressure with the result that the entire area of the sheet material to be distended is not initially free and localized necking-in of the thickness of the distending sheet material adjacent to the restraining portions of the die is substantially diminished.

A further object of this invention is the provision of a method of the character indicated in which a bonded laminate used has its layers acted on in the die by the fluid pressure introduced between the layers while the laminate still maintains the bond between its members inside the die at the outset of the forming operation.

Another object is that of providing a direct and easily performed method for producing hollow products from bonded laminated sheet components, the method introducing a progressive breaking of the bond between portions of the laminate confined inside the die, which breaking is promoted by fluid pressure being introduced between the layers of the laminate.

Other objects and many of the attendant advantages of the invention will be readily appreciated as the same becomes better understood by reference to the following detailed description when considered in connection with the accompanying drawings in which like reference numerals designate like parts throughout the figures thereof and wherein:

FIGURE 1 represents a sheet component of a laminate having demarked thereon a pressure fluid lead-in;

Figure 8:
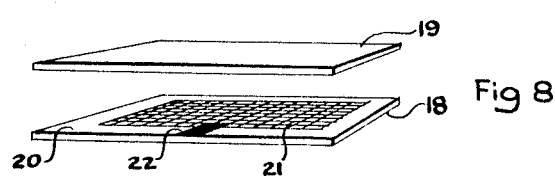
Figure 9:
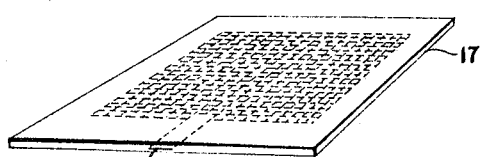
Figure 10:
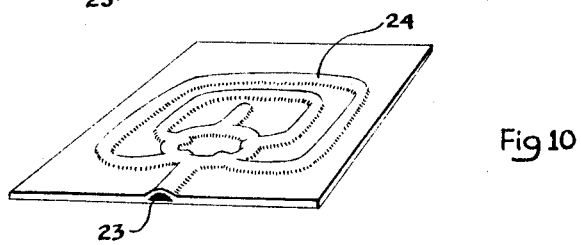
Figure 11:
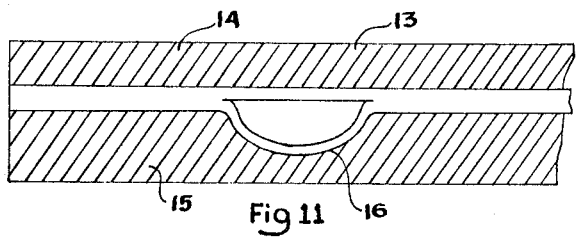
Figure 12:
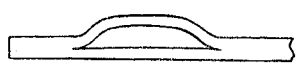
Figure 13:
Figure 7:
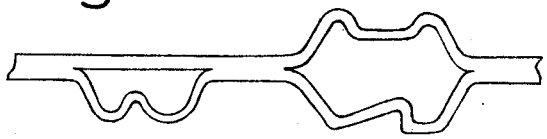
FIGURE 7 is a fragmentary sectional view taken through an expanded laminate to indicate outside configurations which may be achieved by inflating the laminate in a corresponding die.

FIGURES 8, 9 and 10 respectively represent stages in the manufacture of a hollowed sheet product from a laminate;

FIGURE 11 is a fragmentary section taken through a shaping die and a laminate in it; and FIGURES 12 and 13 represent different stages of inflating the laminate in one embodiment.

In the practice of the present invention laminates are forcefully subjected to the breaking of a bond between the layers by fluid introduced under pressure between the layers and acting against the strength of the bond in favor of separating the layers. A space giving access to the fluid to the region of bonding progressively enlarges under the pressure and the laminate actually is peeled apart between layers for the pressure causes the bond to break away progressively in the sense of peeling. The peeling is accomplished within limits so that the layers of the laminate remain bonded together beyond the zone of peeling and hollowing out that is desired. The fluid pressure also distends and stretches at least one of the outside layers of the laminate to enlarge the hollow space in the product being produced. By reason of the progressive breaking of the bond a highly satisfactory progression of stretching and working of the laminate by the force of the pressure is accomplished. The working stresses are better distributed and the thickness of the layer being acted upon remains more uniform throughout. The process is highly satisfactory for the manufacture of any of a variety of products having different shapes and sizes such as heat exchangers, plumbing assemblies, structural components, and so forth.

To the end of preventing peeling apart of the layers of the laminate beyond a certain desired limit by the fluid pressure introduced between the layers, a holding die applied externally to the laminate and having surfaces which restrict or block the spread of peeling preferably is used on the piece being formed. A die for present purposes in fact may include one or more dies or restraining members which restrict the separating effect of the fluid pressure on the laminated workpiece thus to accomplish a more definite and controlled contour body from the standpoint of shape and size of the outside of the piece. In this regard the die either limits the spread of peeling while the pressure of the fluid is being exerted between layers of the piece, or restricts distention of one or more outside layers which are being stretched and worked by the fluid or may accomplish both of these functions. One of the preferred procedures for producing a peel-bond in the laminate is that of providing between the layers which ultimately are to be separated by the force of the fluid, discontinuous bonded and unbonded innerfacial zones of the layers so that the bonded zones remain to be broken by the pressure and the unbonded zones stand as small zones of weakness between the layers. A very important aspect present in affording the bonded and unbonded zones is that the laminate lends itself to any of a number of positions of placement with respect to a contoured die face and any of those bonded and unbonded portions which fall under the die contour respond to the shaping force of the fluid pressure. A proper alignment accordingly is easily accomplished. The extent of the bonded and unbonded faces of the layers is controlled by such considerations as the overall area of laminate required for producing a specific product. Sometimes one layer of the laminate has its entire face peel-bonded to the face of the adjacent layer and reliance is placed upon the clamping effect of a die to restrain the laminate against separation outside the reaches of the die cavity. In certain other instances, the marginal edges of the laminate are firmly bonded and inside this margin there is an area of peel-bonding, as for example, continuous and discontinuous bonded zones of the character already described. Access to the weakened area is readily had through a passage provided between the layers for the insertion of an inflating needle or by a suitable tube extending in from the edge of the laminate and welded in place. A path for access is conveniently made by providing a stop-weld lead-in course between the layers.

In an alternative practice in accordance with the present invention, other forms of peel-bonding than the discontinuous type sometimes are introduced and an example involves that of using a continuous peel-bond between those areas of the laminate which are to be separated by fluid pressure. The bond may be an adhesive or a resin which tolerates peeling, or for that matter an intermediate metal or alloy bonding layer which gives a substantially weak bond between the layers. In other instances, a weld bond afforded by pressure welding the layers by either hot or cold working between rolls, if sufficiently weak, very well permits peeling of the layers when pressure of the separating fluid is applied. These, of course, are examples of many possible peel-type bonds useful in this process. Other and more specific examples of bonds will be given hereinafter with reference to the several figures of the drawing.

Figure 1:
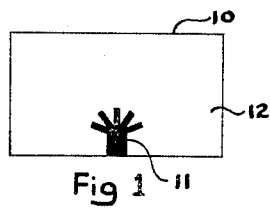

FIGURE 1 represents a plain sheet of metal 10 such as aluminum which has a smooth facial surface and a stop-weld coating 11 applied to one of its faces 12. The stop-weld composition may be any of a number of suitable formulas but the one preferred is a water suspension of colloidal graphite within sodium silicate as a binder. The face 12 is covered by another sheet of metal, this too for example being aluminum, and the two sheets are thereafter subjected to a suitable hot rolling or other pressure weld bonding operation which provides, along with reduction in thickness of the laminate, a weld bond between those innerfacial areas of the sheet which confront each other except at the stop-weld area 11. The composite may then be annealed so as to make the metal softer and easier to expand. The edge of the composite is opened up where stop-weld area 11 exits therefrom and a nozzle is inserted tightly therein. This composite with nozzle is introduced in a shaping die 13 such as is represented in FIGURE 11, and the upper plate 14 and lower plate 15 of the die are closed onto the opposite outside surfaces of the laminate. A fluid pressure source is then connected by a conduit to the nozzle and fluid under pressure is introduced through the lead passage afforded by the stop-weld 11 so as to act between the layers of the laminate to spread them apart. At least one of the die faces is configurated for giving the product shape. Thus, die member 15 has a convoluted channel 16 confronting the laminate and when the fluid pressure begins to act, the peel bond between the layers of the laminate begins to break progressively and the several layers of the laminate begin to separate progressively in the peeling sense. The layer of the laminate which is next to convolution 16 in the die face 15 moves into that cavity and takes the convoluted shape of the die. Thereafter, pressure is discontinued and the members 14 and 15 of the die are moved apart. The shaped product of the laminate is removed. Those areas of the peel bond aside from the convoluted passageway hollowed out in the laminate still remain together to sustain assembly of the article.

Figure 2:
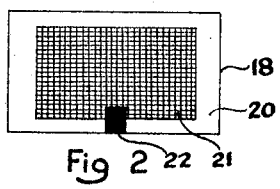
FIGURES 2 and 3 represent sheets having differently delineated bonding surfaces.

In the embodiment represented in FIGURE 2 of the drawing, sheet 18 of a laminated sheet product has on one of its faces a rectangular area 21 characterized by a pattern made up of a plurality of small dots and intersecting lines which area is surrounded by a smooth facial plane 20. As represented, the intersecting lines are of stop-weld material and are in a rectangular coordinate pattern which, when pressure welded to a covering sheet will provide small rectangular bonded islands. At one edge of the sheet and entering into the area of hatching is a stop-weld area 22, to prevent sheet 18 from being welded at that area to a covering sheet 19 of the character represented in FIGURE 8. Cover sheet 19 conveniently has a smooth face to form an innerface with the hatching 21 and frame 20 of sheet 18.

A surface printing operation often is resorted to to provide the hatched pattern. Thus, for example, printing the pattern with stop-weld ink by the use of a silk screen over the area of the sheet which is to receive hatching is often resorted to. The ink may also be applied by other techniques such as spraying through a mask or printing.

Figure 5:
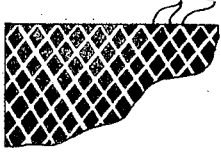
FIGURES 5 and 6 represent portions of sheets and are detail views of stop-weld patterns.

FIGURE 5 represents a pattern made by silk screen operations and it will be noted that the resulting coating on the surface of the sheet includes a plurality of diamond shaped spots or dots 30 separated by intersecting lines 31. The silk screen has been removed and lines 31 have resulted from the covering effect of the screen on the sheet. Thus, the lines 31 are substantially free of stop-weld material leaving the surface of the sheet exposed and dots 30 are dots of stop-weld. On covering this pattern with a further sheet of metal which is to enter the laminate and then hot rolling the several sheets with the pattern disposed at the innerfaces of the sheets, a weld bonding occurs between the metal faces along continuous lines 31 while discontinuous dots 30 have a stop-weld function which prevents innerfacial bonding at the dots. This particular welding and non-welding effect is highly valuable in the forming process. Fluid pressure introduced between the bonded sheets makes the bond peel by breaking progressively at lines 31 while the dots 30 stand in the path of breaking as small islands of weakness. Since the bond is along the lines 31, these lines very effectively arrest escape of the shaping fluid until the bond which they provide is broken apart and the resultant product will hold fluids without leakage through the bond zone.

In way of example, laminates are made having two metal plies of about equal thickness and an intermediate bond along intersecting lines of welding delineated by silk screen and stop-weld material in the manner already described. About 50% of the area treated through the screen is covered by stop-weld material leaving about 50% of the area to be welded along intersecting lines. The lines as initially laid down under the screen range in width between about 70% to 100% of the final thickness of either of the sheets after pressure welding and reduction of the thickness of the sheets have occurred. Thus, as a further example, sheets which each are to be about 0.050 inch thick after pressure bonding are initially coated with a stop-weld composition through a silk screen leaving bonding lines about 0.035 to 0.050 inch width. The preceding are only examples and it will accordingly be understood that a considerable variation of line and dot dimensions is tolerated, depending upon such factors as differences in thickness of the several sheets, strength of peel-bond desired, and the type of hollow product to be produced. Even where two sheets of like thickness are used, the lines and dots in the pattern are susceptible to a considerable variation dimensionally and these dimensions may be adjusted one way or the other to accommodate instant demand.

Figure 6:
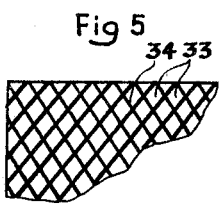

A hatching of the character represented in FIGURE 6 is sometimes used in lieu of that in FIGURE 5. In the FIGURE 6 embodiment intersecting lines 34 of a stop-weld material are printed onto the surface of the sheet to delineate small dots 33 which are substantially free of stop-weld material. Thus, by covering the metal sheet which supports this pattern with another metal sheet so as to place the pattern between the sheets and then hot rolling the composite, a weld bond results which is characterized by the small dots 33 being innerfacially bonded with the cover sheet while intersecting lines 34 remain unbonded. A laminate of this type when exposed to fluid pressure between the layers peels with the dotted bonds being progressively broken. In this arrangement there is usually some tendency for the forming fluid to course along the unwelded lines and accordingly a full blocking effect of the fluid usually does not exist in this type of laminate. Regardless, however, the particular bond lends itself to the manufacture of many products consistent with the present invention.

FIGURE 9 is representative of a laminate 17 which has been formed of two sheets of aluminum or other metal or metals and in which a hatched pattern on the innerface of one of the sheets exists between a fully bonded innerfacial frame area at the margin of the sheets. This intermediate product conveniently is made by hot rolling the composite in a rolling mill where substantial reduction in thickness is achieved to bond the innerfacial areas of the sheet. The bonding occurs consistent with the characteristic of pattern 21 and accordingly this pattern promotes a discontinuous occurrence of welded and unwelded zones at the innerfaces of the sheets. By having a masking composition leading in from the margin of the composite to the hatched area, welding does not occur but a passage is readily available for the introduction of fluid therein such as by an expansion needle or nozzle. On inserting composite 17 into a shaping die such as the convolution die 13 in FIGURE 11 and then introducing fluid under pressure through passage 23 to the hatch-bonded area, a progressive separation of the metal sheets of the laminate ensues under the force of the pressure at those points where the die cavity 16 of die member 15 is opposite the hatched pattern. The laminate peels apart and is stretched into form at the appropriate points to give an expanded sheet metal product which on being removed from the die illustratively takes the form of a product represented in FIGURE 10. All bonded areas of the sheet which are not directly opposite to the convolution of the die remain bonded. The other areas have been peeled apart effectively by the pressure of the fluid introduced. The peeling occurs in a manner which promotes uniform stretching of the metal in the die cavity and at the outset those portions of the metal subjected to the pressure are progressively exposed and worked into the die cavity while the breaking of the bond progressively occurs.

Still another technique is to anodize a sheet of aluminum or aluminum alloy accordingly giving a surface film of oxide on the face of the sheet which is to be bonded and then covering that sheet with a second sheet of aluminum or alloy of aluminum, thereafter cold working the thickness of the superimposed sheets to achieve cold welding at the innerface. A cold rolling operation involving reduction of the thickness of the metal to, at most 33% of the original thickness, can be used to accomplish the cold welding. The working conditions are controlled so that the zone of cold welding responds to fluid under pressure introduced between the sheets at that zone by peeling apart consistent with the formation of the laminate to a desired configuration in a die.

The important ultimate result is that of obtaining a bond which is weak enough to separate by peeling under the conditions practiced in shaping the laminate into a hollow configuration. The properties of the laminate and the bond layer are susceptible to considerable variation depending upon such factors as the pressure which is to be used in achieving the desired shape of product and the amount of deformation which is needed to produce a particular shape or size of hollow product. It is highly important that some bond strength be present at the area which is to be expanded so that a peeling will take place accompanied by progressive working of the material. Under these conditions stretching and forming results which avoids subjecting the whole area of deformation to the force of the pressure at the outset. Some of this area is reserved behind an unbroken bond until initial areas have been somewhat worked and then with an ensuing peeling action of the layers additional areas are subjected to the pressure load. This progressive working effect avoids displacing a whole membrane of the sheet bridging the die cavity until the entire innerfacial bond has been separated progressively. The pattern of working accordingly diminishes the length of time that the whole area which ultimately will be deformed is free as a membrane across the holding edges of the die. The boundaries of the area accordingly are relieved of the full pressure load and there is a material alleviation of the load exerted on these edges to arrest necking-in of the thickness of the sheet material adjacent to these edges. More severe deformations and greater distentions of the sheet material accordingly are tolerated without danger of rupture under the fluid pressure applied.

Figure 3:
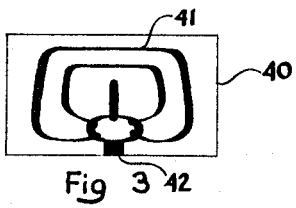

Sometimes the peeling action afforded in the practice of this process is combined with the existence initially of a delineating stop-weld pattern which outlines the general course of the passage which is to be hollowed out but has a much more narrow dimension than the full dimension across the die cavity. Under these conditions an initial free passage for the fluid introduced between the layers of the laminate is provided along the cavity and this passage is flanked by peelable bonded zones in which the bond must be broken by peeling before full hollow capacity of the product is attained by the fluid pressure introduced. To illustrate, reference is made to FIGURE 3 of the drawing. A sheet of metal 40 has one of its faces printed or coated with thin stripes 41 of a masking material which stops welding and these lines are substantially smaller in width than the corresponding width of the cavity of the die which is to overlie the masking substance. The narrow lines are in closed circuit with each other and are connected by a lead 42 of the masking substance extending from one edge of the blank. A cover sheet of metal is placed over that face of the sheet which carries the masking and thereafter the sheets are pressure welded to achieve a welding at the innerfacial areas which are directly exposed to each other and are free of the masking substance. The masking lines 41 and 42 prevent welding and accordingly the sheets are free from each other at those lines, then by placing the composite in a shaping die which has a cavity receiving lines 41 but much wider than the lines, it follows, that with the laminate fully clamped, fluid under pressure is introduced through the passage available as the result of the masking 42 and this pressure enters along lines 41 causing a progressive peeling of the adjacent bonded zones of the sheet accompanied by stretching and forming of the laminate to the configuration prescribed by the die cavity.

As an example of a specific practice in accordance with this invention, two sheets of 1100–F aluminum, each having a thickness of 0.125 inch, are sheared to blank sizes of 18 inches by 8 inches and the blanks thereafter are cleaned in a suitable cleaning solution such as a soapy etchant alkaline cleaner including small amounts of such materials as tetrasodium pyrophosphate, sodium carbonate and trisodium phosphate with or without inhibitors such as sodium metasilicate or sodium disilicate and a wetting agent. An aqueous solution having a concentration of about 4 to 6 ounces of the alkaline preparation per gallon of water often is used with the metal subjected to it for approximately five minutes at 120° F. temperature of the cleaning bath. This preferably is followed by a rinse in cool, clean water for about one minute at a temperature of approximately 70° F. In a further cleaning step often used the aluminum sheet is subjected to highly alkaline etch cleaner principally containing sodium hydroxide or sodium carbonate and a wetting agent together amounting to about 4 to 6 ounces per gallon of water. The bath temperature usually is in the vicinity of 140° F. to 150° F. This treatment too is followed by rinsing for approximately one minute in water having a temperature of about 70° F. The metal sheet then is immersed in a chromic-sulfuric salt bath for deoxidizing using a bath temperature of about 70° F. and a concentration of acid salt of about 14 ounces to 16 ounces per gallon of water. The time of treatment ranges from between about 3 to 5 minutes. A rinsing step in cool water at about 70° F. for approximately one minute then is introduced and from this rinsing bath the sheet is transferred to a hot de-ionized water rinsing bath maintained at a temperature of about 180° F. to 212° F. The aluminum sheet then is removed from the bath and is dried in air for about five minutes.

One of the clean aluminum sheets then is made ready for coating with a stop-weld material such as a water suspension of colloidal graphite with sodium silicate as a binder. A silk screen is placed over the face of the sheet which is to receive the coating and then the stop-weld material is introduced through the silk screen thus to provide a multiple spotted pattern of stop-weld, the spots corresponding to the openings in the screen and these areas of the blank covered by the strands of the screen remaining substantially free of stop-weld after the screen has been removed. A solid area of stop-weld is put from the edge of the sheet leading into the multiple dotted pattern so as to ultimately give access for the fluid to be introduced under pressure to the laminate after drying the stop-weld composition, the other blank then is placed face down directly over the stop-weld pattern with all edges even and the leading end of the composite is then cold welded in at least two places in order to hold the blanks assembled for handling. The leading end is that end which is to be introduced between welding rolls. Preliminary to welding, the blanks are preheated to a temperature of about 800° F. to 900° F. Then they are immediately bonded together at the preheating temperature by rolling the entire product in a rolling bank. A first hot pass through the rolls reduces the composite blank thickness from 50% to 60% and the bonded sheet is then cold rolled to a final thickness of about 0.1 inch. Thereafter the sheet is annealed at a temperature of about 1000° F. for a period of some ten minutes' time or more. The annealing has the effect of strengthening the bond by recrystallization across the bonded innerfacial zone and softening the metal making it easier to expand.

Before expanding the laminate by fluid pressure in a die that edge of the sheet composite into which the solid graphite masking is afforded for the fluid entrance passage is trimmed to locate the passage entrance and the entrance is opened to accommodate a pressure fluid feed line introduced into communication with the pattern area between the sheet. The latter connection conveniently is made after introducing the laminate into a configurated convoluted die which serves to hold the laminate securely in place over the die cavity and marginally firm all around the cavity so as to prevent undue peeling beyond the configuration of the die. A lubricant of the type used in sheet metal working advantageously is coated over the faces of the die especially where working is to occur or is applied to the outside surface of the laminate itself at points which are to receive working forces. With the laminate held in the die a liquid such as water under pressure of about 4000 pounds per square inch is introduced into the laminate through the passage affording access to the discontinuous bonded and unbonded zones and this pressure is applied for a period of about three seconds' time. This serves to expand that part of the laminate which lies next to the die recesses and the bond progressively breaks with ensuing peeling separation of the aluminum sheet material and distention of the sheet to conform to the die configuration. The hydraulic pressure then is released and the die is separated to give access to the product resulting.

As a further example, two sheets of 1100–F aluminum each having an initial thickness of about 0.100 inch are sheared to blank size of approximately 18 inches by 8 inches and are subjected to cleaning in accordance with the practice mentioned in the preceding example. With the sheet metal blanks dry after the cleaning steps, however, an entrance passage zone is demarked from the edge of one of the sheets with graphite in suitable coating vehicle, this extending over one of the faces of the sheet to a suitable inside terminus. The other aluminum blank is then placed face down directly over the masking and all edges are evened up with those of the corresponding blank. That edge of the composite which is to first enter a bank of hot working rolls is cold welded at several places to secure the assembly for handling. This is followed by preheating the blanks to a temperature of about 800° F. to 850° F. and then immediately bonding the assembly together by hot rolling at the temperature of preheating. A first hot pass reduces the composite blank thickness from 45% to 50% and the bonded sheet is then cold rolled to a thickness of about 0.100 inch. Thus, in this instance, the entire innerfacial areas of the composite are weld bonded and yet the several sheets may be peeled apart under operating conditions later practiced. These conditions for example include introducing the composite into a die having desired cavity configuration and which clamps the laminate firmly in place so as to hold it and arrest undue peeling beyond those areas of the die which accommodate expansion. By introducing water under pressure of about 5000 pounds per square inch for about 3 to 5 seconds through the access opening afforded by the graphite masking, this pressure semi-expands the sheet such as to a condition represented in FIGURE 12 of the drawing but not to required height. The expansion is made possible by a progressive peeling action brought about by the fluid pressure and progressive breaking of the bond in the vicinity of the die cavities. After being partially worked, as described, the composite is removed from the die and is annealed at a temperature of about 1000° F. for a period of some ten minutes. This increases the bond strength in the unexpanded areas and softens those portions of the laminate which have already been partially expanded so that a further expansion is readily tolerated. The sheet is then inflated again in the die to bring the configuration up to the desired height such as is represented in FIGURE 13 of the drawing. This is done by applying expansion pressure of about 4000 pounds per square inch for a period of three seconds while those areas of the laminate aside from the die cavities are positively held flat against separation by the die faces. The expansion and hold down pressures are then released immediately and the shaped part is removed from the die.

In the preceding example, a stop-weld pattern was used for providing an insert opening. While this is helpful, it is not essential, since an opening can be made in the edge of the composite along the peel-bond zone by means of a sharp chisel and an expansion needle or nozzle can be inserted therein.

Figure 4:
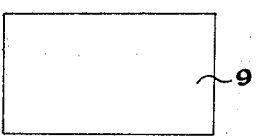
FIGURE 4 represents a sheet component having no lead-ins or delineated surfaces.

This chisel method would be used in the case of a composite made of plain sheets such as shown at 9 in FIGURE 4. The composite made from these sheets has a peel-bond which is produced by controlling one or more of the following: metal composition, metal temper, temperature, percent reduction, cleanliness of the initial sheets and so forth.

In making expanded weld bonded products and other hollow sheet metal products in accordance with the process, it is the preferred practice to make the laminate of at least two plies of metal sheet superimposed on each other and having an innerfacial bond and in which the strength properties of the bond tolerate peeling the sheets apart under a pressure load imposed to break the bond. In establishing that bond between the superimposed sheets it will be understood the sheets are sometimes exposed to the bonding pressure while sufficiently hot to accomplish innerfacial welding which nevertheless will tolerate peeling when the force of the pressure is introduced between the sheets. The hot roll bonding strength often is enhanced by an annealing treatment before the laminate is subjected to use. This annealing treatment promotes recrystallization at the weld and accordingly a stronger bond results. There are occasions where the annealing is omitted for the strength of the weld otherwise is adequate to resist the working pressure of the forming fluid to assure that a peeling action progressively occurs while a laminate is being formed into a hollow object. The annealing treatment, however, is a highly useful measure for introducing a greater reluctance to separation of the bond under the working load and accordingly promotes a greater distention of those portions of the laminate which are to enter the cavities of the die as an incident to the forming operation, the distention being more progressive before the bond is entirely broken within the boundaries of the die wall. In certain instances, too, advantage is found in only partially forming the laminate in the die, this step, for example, terminating at a stage where the layers have been peeled apart entirely within the prescribed limits of the die by full expansion though conformity with the die wall has not yet occurred. To relieve the working stresses at this point, the partially worked product is removed from the die and subjected to an annealing treatment which not only relieves stresses which have accrued especially where cold working has been practiced to arrive at the partially completed product but a strengthening of the bond may even be developed at this point by recrystallization particularly where the earlier annealing step for this purpose has been omitted. Of further importance, the metal is softened by the annealing and is more responsive to further working in the die. Then, by placing the partially expanded product back into the die and continuing with the application of fluid under pressure to the hollow zone, the laminate is fully expanded into contact with the faces of the die and accordingly thereafter is removed. Annealing of the final product also is often practiced to strengthen the weld which remains between the several layers outside the hollowed out portion.

Accordingly, it will be appreciated that the process described herein is well suited to the manufacture of many different types of hollow products and that the process is a highly practical one which promotes effective working of laminated sheet material under conditions where stresses of the working are distributed to good advantage. The peel-bonded laminates are easily produced and allow a considerable tolerance in the die for proper placement for the expanding action of the fluid subsequently to ensue giving products of hollow form. The reluctance of the bond to separation at the outset causes the working forces to be applied at the outset to less than the whole area which ultimately is to be acted on by the fluid. This manner of working introduces practical advantages and has been found to give a more uniform overall working action on the sheet material. Cold working the laminate by fluid pressure is feasible to distend the appropriate areas into the die cavities and the process alternatively permits hot working procedures in lieu of cold working especially where the characteristics of the sheet material being used and the nature of the product being produced suggests that it is most feasible to follow that practice. In all, the process not only offers considerable latitude over specific practices which may be followed to accomplish the end result, but for such reasons as the laminates called for the method is easy to practice permitting working tolerances in inserting the laminate in the die and forming the laminate and further accomplishing a deformation in which necking-in is substantially avoided.

Thus, it will be seen that with this invention the various objects noted herein together with many thoroughly practical advantages are successfully achieved. Peel-bond characteristics of the laminates used and peeling by pressure exerted on these laminates contribute highly useful and worthwhile results all with substantial advancement of the art.

While particular emphasis has been placed on the production of hollow sheet metal products, and especially those made from aluminum and its alloys, it will be distinctly understood that certain other worthwhile hollowed out products such as those of synthetic resin sheet laminates, or laminates including synthetic resin and metal sheets compositely, also may be made in accordance with the method of this invention still with certain advantages.

As many possible embodiments may be made of this invention and as many possible changes may be made in the embodiments hereinbefore set forth, it will be distinctly understood that the matter described herein is to be interpreted as illustrative and not as a limitation.

The bond strength developed between the sheets prior to inflation should generally be less than the yield strength of the metal to be expanded into the die, but sufficient that the resulting product is capable of withstanding the pressure to be encountered during use. Thus, one of the limiting conditions for use of the product as a pressure vessel is bursting of the passageway formed in the sheet. That is largely a calculable matter, however, since it is dependent primarily upon the metal alloy involved, the thickness of the sheets, and the cross-sectional configuration of the passageway.

The possibility that the inflated sheet will fail by peeling before bursting is another limiting condition which depends on the magnitude of the bond strength compared to the bursting strength. The bond between adjacent sheets is weak enough to be forceably broken by the application of high-pressure inflating fluid without unduly distorting the metal, but strong enough that following inflation and removal from the die the unsupported sheet is capable of withstanding an internal pressure substantially in excess of 100 p.s.i. without peeling apart adjacent the passageway. This condition is satisfied, employing the procedures set forth herein by use of stop-weld material constituting about 50% of the area to be expanded, as previously mentioned. For a lesser proportion of stop-weld material, the strength of the bond will be even greater. For example, when sheets of 1100 aluminum are weld-bonded in substantially face-to-face contact, with little or no stop-weld material interposed but otherwise in accordance with the practice described in the foregoing examples, the bond is such that the resulting inflated sheet product will withstand at least 500 p.s.i. without failure due to peeling. In that case, the failure condition for applied pressure up to 500 p.s.i. will be bursting rather than peeling, and at higher pressure it may be either bursting or peeling.

Another measure of the bond strength achieved in the practice of the invention is the pressure required to delaminate the welded sheets. In general, the pressure to delaminate will be substantially greater than 500 p.s.i. (ordinarily 1500 p.s.i. or more) since the effect must be such as to not only break the bond but also to stretch and expand the metal into the die cavity.

What is claimed is:

1. In making hollowed products by selective expansion of areas of a multi-layer laminate, the process which comprises supporting in a die a multi-layer laminate characterized by having adjacent layers peelably bonded together at the interface therebetween including at least a substantial part of said interface in the areas thereof to be expanded, introducing fluid under pressure between said adjacent layers where the bond is, breaking said bond in an increment of the area to be expanded, progressively working and expanding the thus separated portion of at least one of said layers into said die by the pressure of said fluid while said layers in an adjacent increment of said area to be expanded are restrained from peeling by said bond, continuing to progressively break said bond in successive increments of the area to be expanded, along the direction in which the fluid flows, and to work and expand the thus separated successive portions of at least one of said layers, whereby there is accomplished said selective expansion without exposing the separated portions of said laminate, along the boundaries of said area to be expanded, to the full load of expansion pressure.

2. A method as set forth in claim 1 in which said layers are metal.

3. A method as set forth in claim 2 in which said layers comprise aluminum.

4. A method as set forth in claim 3 in which said layers are of substantially the same thickness.

5. A method as set forth in claim 3 in which said multi-layer laminate is made by superimposing two metal sheets and pressure bonding said superimposed sheets at their interfaces to produce said laminate.

6. In making hollowed products by selective expansion of areas of a multi-layer laminate, the process which comprises superimposing two sheets of metal on each other, separating the inner faces of said sheets by stop-weld material in successively occurring closely proximate areas substantially uniformly distributed over a substantially large portion of the inner faces thereof and comprising about 50% of the areas of said inner faces, so that there are frequently occurring interruptions exposing said inner faces directly to each other, pressure weld bonding said sheets to provide interfacially welded zones between said sheets corresponding to said interruptions, inserting the resultant multi-layer laminate in a die, restraining a portion of said laminate from separation by said die, introducing fluid under pressure between said adjacent layers, progressively breaking said interfacially welded zones with the force of said pressure, and continuing the application of said pressure until at least one of said layers is appreciably stretched and distended from the adjacent layer giving a hollow space between said layers.

7. In making hollowed products by selective expansion of a multilayer laminate, the process which comprises superimposing two sheets of metal on each other and separating the inner faces of said sheets by a layer having small spots in close proximity to each other and bounded by narrow intersecting lines of stop-weld material exposing said faces directly to each other, pressure weld bonding said sheet giving spots of welding between said sheets where said sheet faces are exposed to each other and unbonded narrow intersecting lines across said stop-weld material, inserting the resultant multi-layer laminate in a die, restraining a portion of said laminate from separation by said die, introducing fluid under pressure between adjacent layers, progressively breaking said interfacially welded spots with the force of said pressure, and continuing the application of said pressure until at least one of said layers is appreciably stretched and distended from the adjacent layer giving a hollow space between said layers.

8. In making hollowed products by selective expansion of areas of a multi-layer metal laminate, the process which comprises inserting in a die having a cavity a multi-layer metal laminate characterized by having inner faces of adjacent layers peelably bonded together, in at least a substantial proportion of the area thereof to be expanded, restraining a portion of said laminate from separation by said die, introducing fluid under pressure in said cavity between said adjacent layers, progressively breaking said bond with the force of said pressure, continuing the application of said pressure until at least one of said layers is appreciably stretched and distended from the adjacent layer giving a hollow space between said layers, and discontinuing the application of said pressure, annealing said laminate, and thereafter resuming the shaping of said laminate.

9. A multi-layer laminate adapted for expansion with at least one exterior surface retained against a die member having a shaped recess by introducing fluid under pressure between adjacent layers thereof to form a passageway panel conforming to the die configuration, said laminate being characterized by having adjacent layers peelably bonded directly together over a substantial proportion of the interface therebetween, in the area to be expanded, and by having stop-weld material in said interface defining discontinuous unbonded interfacial zones of weakness distributed over the interface between said layers and separated by bonded zones, said bonded zones constituting the substantial proportion of the interface where said layers are peelably bonded together.

10. A laminate according to claim 9 wherein said discontinuous unbonded interfacial zones of weakness are substantially uniformly distributed over the area between said layers and comprise up to about 50% of said area.

11. A laminate according to claim 9 wherein the stop-weld material covers about 50% of the area of the laminate and is applied by a silk screen process.

12. A laminate according to claim 9 wherein the stop-weld material is applied by a silk screen process and the lines initially laid down under the screen range in width between about 70% and 100% of the final thickness of one of the adjacent layers.

References Cited by the Examiner

FOREIGN PATENTS 212,814  2/1958  Australia.

OTHER REFERENCES

Australian patent abstract, 10,471/55, January 10, 1957.

JOHN F. CAMPBELL, *Primary Examiner.*

J. D. HOBART, *Examiner.*